(12) United States Patent
Andberg et al.

(10) Patent No.: US 6,787,718 B2
(45) Date of Patent: Sep. 7, 2004

(54) DEVICE, METHOD, AND SYSTEM FOR DETECTING THE PRESENCE OF LIQUID IN PROXIMITY TO ELECTRONIC COMPONENTS

(75) Inventors: John William Andberg, Santa Cruz, CA (US); Stephen Jerry Chaikin, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 19 days.

(21) Appl. No.: 10/134,222

(22) Filed: Apr. 25, 2002

(65) Prior Publication Data

US 2003/0201158 A1 Oct. 30, 2003

(51) Int. Cl.[7] .............................................. H01H 29/00
(52) U.S. Cl. .................................................. 200/61.04
(58) Field of Search .......................... 200/61.04, 61.05, 200/61.06

(56) References Cited

U.S. PATENT DOCUMENTS

| | | | |
|---|---|---|---|
| 2,742,541 A | 4/1956 | Bunting | 200/61.06 |
| 4,538,141 A | 8/1985 | Feldman | 200/61.05 |
| 4,570,477 A | 2/1986 | Sugibuchi | 200/61.04 |
| 4,972,179 A | 11/1990 | Akiba | 200/61.05 |
| 5,188,143 A | 2/1993 | Krebs | 200/61.04 |
| 6,580,013 B1 | 6/2003 | Belloso | 200/61.04 |

OTHER PUBLICATIONS

Water Alert Sensor Cable, Dorlen Products, Milwaukiee, WI, Principle of Operation and Construction, p. 3, SC–01–no date.

Specification For Water Leakage Sensor S–1F, Sumitomo 3M Limited, Tokyo, Japan, Fig. 1, Sep. 2001—S. Suzuki.

Linear Leak–Detection; Hydro–Temp, Inc., Baton Rouge, LA; Thomas Publishing Company, p1–2; Jul. 2001.

*Primary Examiner*—Renee Luebke

(57) ABSTRACT

An elongated sensor is provided for detecting the presence of a liquid in an electronics system. The sensor includes an elongated sensor element having a pair of adjacent electrical conductors, and a liquid permeable material that when dry electrically insulates the conductors, and when wet with a liquid at any point along the length of the conductors allows electric coupling of the conductors. The sensor also includes a detector operable to detect the presence of the liquid by sensing the electrical coupling of the conductors.

39 Claims, 4 Drawing Sheets

US 6,787,718 B2

DEVICE, METHOD, AND SYSTEM FOR DETECTING THE PRESENCE OF LIQUID IN PROXIMITY TO ELECTRONIC COMPONENTS

BACKGROUND

The electronics-industry is increasing the density of electronic components within electronic systems, and this increase results in increased heat that must be dissipated from the systems. The increased component density is fostered in part by increased signal frequencies that require a shorter signal path between components. Furthermore, increased component density increases the heat density, and reduces the space available in the system for cooling by forced air circulation.

Because of the increased heat, electronics manufacturers are more frequently using liquid to cool high-density electronic systems. Techniques for liquid cooled, high-density systems include immersion of the system in a liquid cooling bath, and mounting certain components of an electronic system on a liquid-cooled plate. Water is frequently used for the coolant, particularly deionized water. Other types of coolants are used as well.

Many of today's high-density electronic systems are also expensive. Leaks can quickly damage expensive electronic components if the coolant leaks into the electronic system, often resulting in a high-dollar loss and service interruption. Such damage can occur within a minute or two of coolant drops entering the electronics system.

Existing leak detectors are generally bulky devices designed for protection of buildings and large pieces of equipment against water leaks. The detectors generally operate by sensing a change in resistance between two electrically isolated wires contained in a sensor cable routed through an area to be protected. Water enters the sensor cable and forms a conductive path between the two wires, causing the resistance between the wires to drop. The resistance drop is detected by an ohm-meter-like device that forces a current between the wires and measures the voltage when a conductive path is formed.

Several types of sensor cables or elements are available, but they are not suitable for high-density electronics systems for several reasons, including size, and response parameters. One type of sensor cables uses water resistant insulation along its length, with discrete gaps in the insulation where the pair of wires are uninsulated and exposed to water. The gaps in the insulation are generally placed at regular intervals, with the separation interval ranging from several inches to several feet. The water must be at the location of the gap, and have sufficient depth to conductively bridge across the exposed wires. This type of sensor provides only a limited ability to sense water. The basic feature of this type of sensor makes it unsuitable for use in small electronics systems because the water might not collect at a gap in the insulation, and the sensor would not be activated. Another type of sensor uses a polyester wicking insulation to separate and protect the sensor wires, which are spaced about one-quarter of an inch apart. However, the size and physical characteristics of the existing wicking insulated sensor elements makes them unsuitable for high-density electronics systems. For example, they are more than one-inch wide, which is too wide to be routed among the small spaces available in high-density electronics systems. They do not have an optimal response profile for sensing the presence of water to protect electronics systems, including response time and distinguishing between high humidity and water drops. Furthermore, they do not have an acceptable level of sensitivity to the deionized water commonly used in cooling systems of electronic systems.

In view of the foregoing, there is a need in the art for a sensor that can quickly detect the presence of a liquid in an electronics system.

SUMMARY

In one embodiment of the invention, an elongated sensor element can detect the presence of a liquid in an electronics system. The sensor element includes a pair of adjacent electrical conductors, and a liquid permeable material that when dry electrically insulates the conductors, and when wet with a liquid at any point along the length of the conductors allows electric coupling of the conductors. The liquid permeable material may be arranged to wick the liquid into the sensor element, and the wicked liquid may electrically couple the conductors.

Such an elongated sensor element can quickly sense a liquid at any point along its length, and is suited for placement in the small spaces of a liquid cooling, high-density electronics system. A liquid is quickly sensed in part because any liquid proximate to the sensor element is wicked into the sensor element without waiting for the liquid itself to bridge the adjacent electrical conductors. Consequently, such an elongated sensor element is able to quickly sense the presence of leaks to limit possible damage to electronic components.

These and various other features as well as advantages which characterize the present invention will be apparent from a reading of the following detailed description and a review of the associated drawings.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like referenced numerals identify like elements, and wherein:

DETAILED DESCRIPTION

Figure 1:
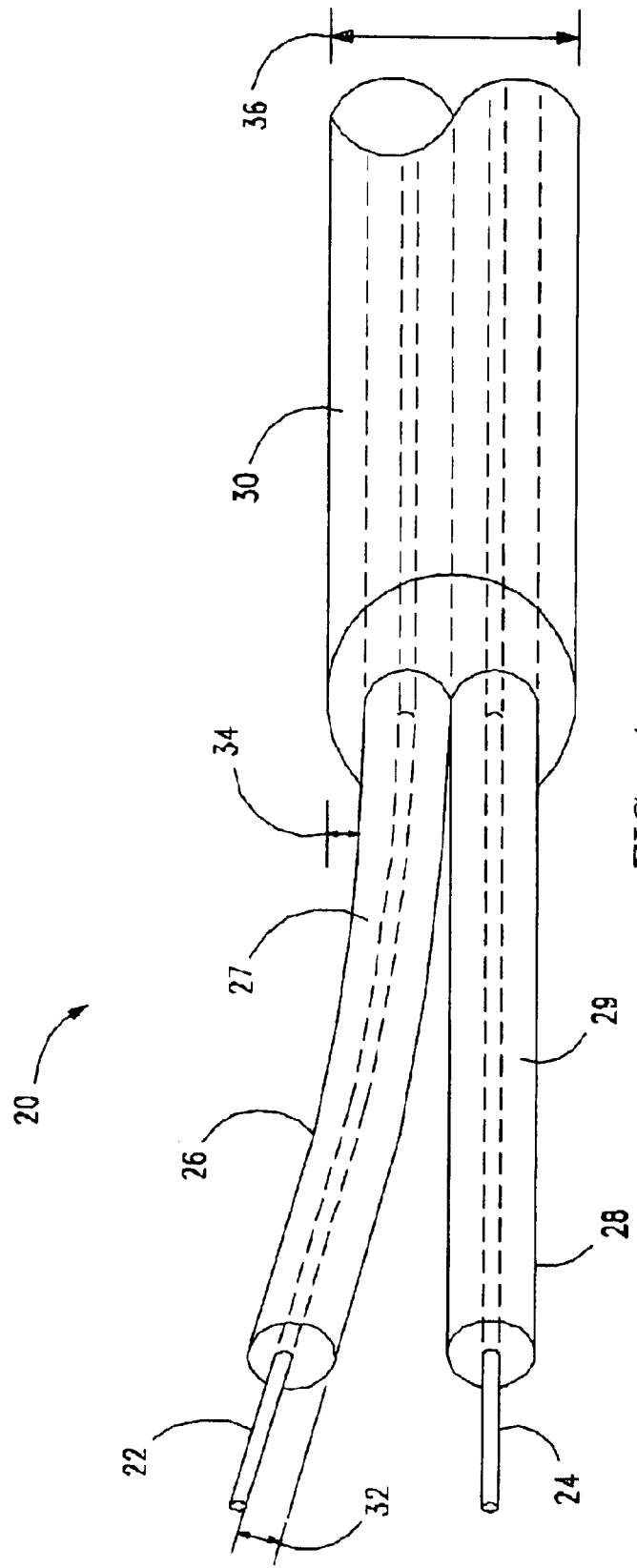
FIG. 1 is a perspective view of an elongated sensor element for detecting the presence of a liquid according to an embodiment of the invention.

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Throughout the specification and claims, the following terms take the meanings explicitly associated herein unless the context dictates otherwise. For example, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, or data signal. The meaning of "a", "an", and "the" include plural references. The meaning of "in" includes "in" and "on." Referring to the drawings, like numbers indicated like parts throughout the views. Additionally, a reference to the singular includes a reference to the plural unless otherwise stated or inconsistent with the disclosure herein.

FIG. 1 is a view of an elongated sensor element 20 for detecting the presence of a liquid according to an embodiment of the invention. Elongated sensor element 20 is a thin, flexible cable particularly suited for sensing the presence of liquid proximate to electronic components. Sensor element 20 wicks moisture along its entire length and is small and flexible for routing among small spaces in high-density electronic components. In addition, sensor element 20 provides an optimal response profile for sensing the presence of water in electronics systems, including an appropriate response time and distinguishing between high humidity and drops of liquid.

In one embodiment, the elongated sensor element 20 includes a first conductor 22, a second conductor 24, a first wicking insulator 26, a first insulated wire 27, a second wicking insulator 28, a second insulated wire 29, and an outer wicking insulator 30. The first and second conductors 22 and 24 are made of an electrically conductive material that is corrosion resistant for the intended environment, such as stainless steel. The first and second conductors 22 and 24 are 24-gauge wire, but may be any diameter suitable for arrangement of the sensor element 20 in the intended electrical system. For example, the conductor size may be between 32 gauge and 16 gauge.

The first wicking insulator 26, the second wicking insulator 28, and outer wicking insulator 30 are each made with pure fiberglass yarn. The fiberglass yarn is woven individually around the first conductor 22 and second conductor 24, forming a first insulated wire 27 and a second insulated wire 29. The woven fiberglass yarn forms an insulating layer about 0.003 to 0.005 inches thick (32) around each conductor 22 and 24. Another step in making sensor element 20 includes placing insulated first wire 27 and insulated second wire 29 adjacent to each other. An additional layer of pure fiberglass yarn is wound around them to form the outer wicking insulator 30, which is about 0.006 inches thick (34). When a 24-gauge wire is used for the conductors 22 and 24, the sensor element 20 has an elliptical cross-section and its width is typically about 0.065 by 0.040 inches (36). Each insulated wire has a diameter of approximately 0.026 inches. This places the first insulated wire 27 and a second insulated wire 29 within about 0.026 inches of each other, allowing the sensor element 20 to respond quickly to small amounts of liquid.

The woven, fiberglass yarn of insulators 26, 28, and 30 insulates the conductors 22 and 24 when dry, and forms a liquid permeable material that will quickly wick a liquid. Sensor element 20 has a resistance ranging between several mega-ohms (M ohms) and several giga-ohms (G ohms) when fiberglass insulators 26, 28, and 30 are dry. When contacted by a liquid, the pure fiberglass yarn used forms insulators 26, 28, and 30 wicks the liquid into the sensor element 20, wetting the fiberglass insulators 26, 28, and 30, and allowing the liquid to form an electrically conductive path between conductors 22 and 24. When a five-inch portion of fiberglass insulators 26, 28, and 30 is wetted by about five equally spaced drops of water, the sensor element 20 has a resistance of approximately 300K ohms.

Impurities in the fiberglass yarn may affect the rate at which a liquid is wicked into the sensor element 20, and the quantity of a liquid required to electrically couple the conductors 22 and 24. Typically, the impurities include sizing, binders, and contaminates. Generally, a faster electrical coupling in the presence of a liquid results when all impurities are removed from the fiberglass yarn. Consequently, a final step in assembling sensor element 20 may include baking or chemically washing to remove sizing, binders, and contaminates in the fiberglass yarn. The contaminates might slow the wicking speed of the insulators 26, 28, and 30, and increases the quantity of liquid required for electrical coupling between conductors 22 and 24.

The small, overall thickness (0.040 by 0.065 inches) of sensor element 20 and the flexibility of the 24-gauge stainless steel conductors 22 and 24 in the above embodiment allows sensor element 20 to be used to detect liquid in the close physical spacing of a high-density electronics system. Because the insulators 26, 28, and 30 expose the conductors 22 and 24 to moisture along their entire length, the sensor element 20 can sense liquid at any point along its length. The physical parameters of sensor element 20 provide advantageous wicking and electrical characteristics for sensing a liquid in proximity to electrical components.

The impurity levels in the fiberglass insulation used in making sensor element 20 may be adjusted to control the rate at which a liquid is wicked into the wicking insulators 26, 28, and 30 and the resulting response time. Controlling the wicking rate is desirable because it affects the time required for conductors 22 and 24 to electrically couple and indicate the presence of a liquid. For example, if the conductors 22 and 24 are electrically coupled within approximately five seconds of the outer wicking insulator 30 being contacted by a liquid, the sensor element 20 will be overly sensitive and will undesirably respond to high humidity levels that are not necessarily indicative of a liquid being present. An optimum minimum electrical coupling response time is between five and ten seconds, and is preferably ten seconds. A maximum electrical coupling response time to detect the presence of a liquid in a high-density electronic system is not more than three minutes, preferably one minute, and optimally is between ten and twenty seconds. A method of testing the response time is to put five drops of water on the sensor element 20 at one-inch intervals, and measure the time required for the conductors 22 and 24 to become electrically coupled. An alternative method of testing the response time is to submerge a one-inch length of the sensor element 20 in a cup of water and measure the response time.

Still referring to FIG. 1, an embodiment of the sensor element 20 was made by treating a length of 24-gauge SERV-RITE® Series 306 wire and cable from Watlow Electric Manufacturing CO., St. Louis, Mo. The SERV-RITE® Series 306 wire and cable is a braided fiberglass insulated wire with two stainless steel conductors. The Series 306 wire is marketed as a moisture resistant, high temperature, thermocouple grade wire to be used for thermocouple leads in clean rooms. The Series 306 wire includes braided fiberglass insulation around each of two conductors, and a second layer of high-purity fiberglass insulation braided around the pair of conductors to form a single wire. However, the Series 306 is not suitable in its marketed form as a sensor element 20 because impurities present in the fiberglass insulation undesirably affect its wicking properties. To make the Series 306 wire have the properties desired for an elongated sensor element 20, the Series 306 wire is baked in an oven at approximately 550 to 700 degrees Fahrenheit for approximately five to ten minutes. The time and temperature may be adjusted to control the response characteristics of the sensor element 20. The baking partially removes sizing, binders, and contaminates that affect the wicking rate and the electrical coupling between conductors 22 and 24, making the Series 306 wire suitable for use as an elongated sensor element 20. Alternatively, chemically washing the Series 306 wire with solvents, such as isopropyl alcohol, lacquer thinner, and acetone also removes the sizing, binders, and contaminates. Baking at higher temperatures removes most of the binders in the fiberglass insulation, undesirably resulting in the sensor element 20 detecting humidity in the air instead of liquid in contact with the sensor element 20.

In an alternate embodiment, a conductive substance, such as salt, may be included in the fiberglass insulators 26, 28, and 30 to electrically couple the first conductor 22 and the second conductor 24 independent of any electrical conductive properties of the liquid. This would allow sensor element 20 to sense a leak of a non-conductive coolant.

Figure 2:
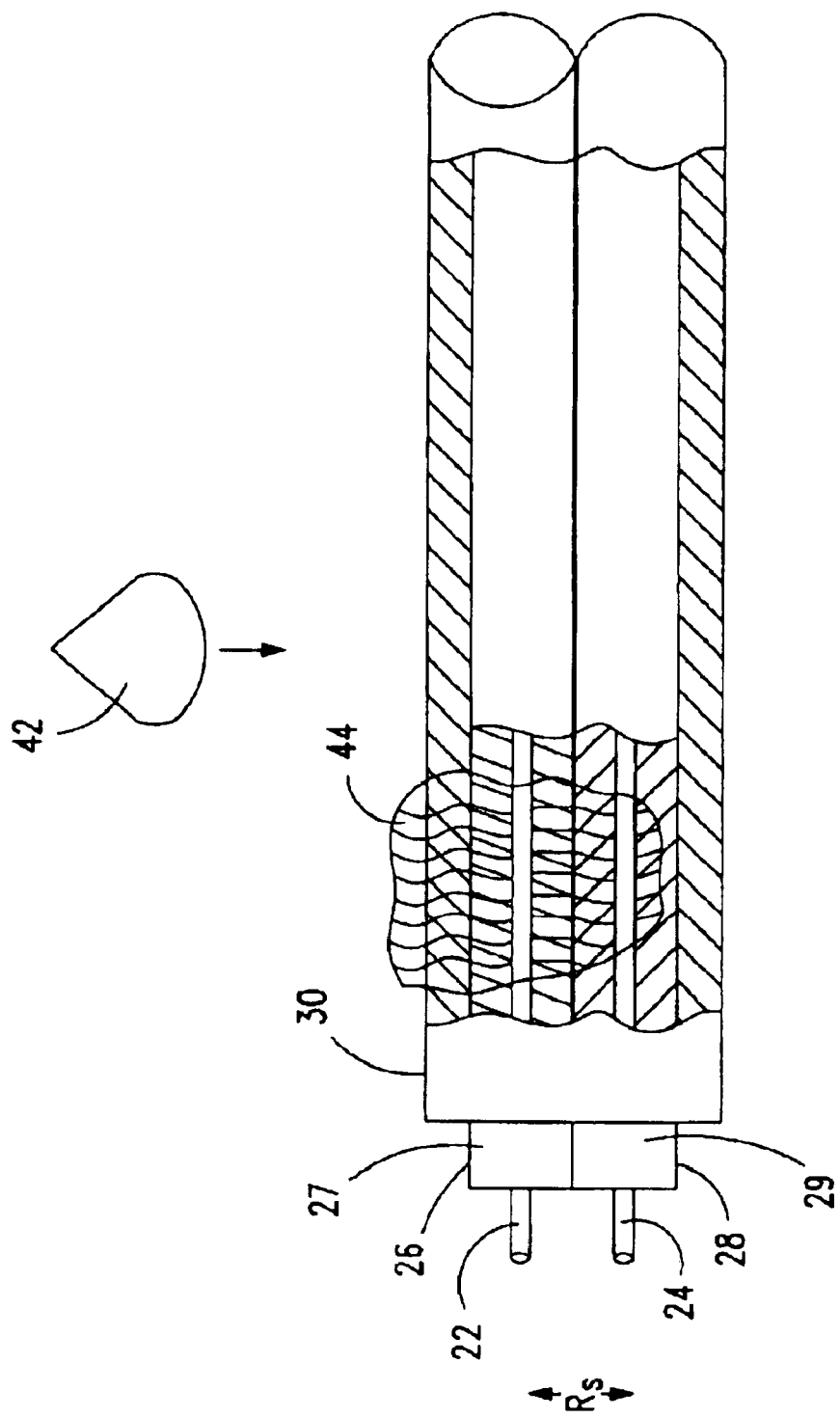
FIG. 2 is a partial longitudinal cross-section view of the sensor element of FIG. 1 with a drop of moisture approaching and a drop of moisture wicked into the sensor element according to an embodiment of the invention.

FIG. 2 illustrates a multiple layer, partial longitudinal cross-section view of the sensor element 20 of FIG. 1 with a drop of liquid 42 approaching and a drop of liquid 44 wicked into the sensor element and electrically coupled conductors 22 and 24 according to an embodiment of the invention. $R_s$ is the sensor electrical resistance (or impedance) between conductors 22 and 24, and is between several mega-ohms and several giga-ohms before any liquid is wicked into the insulation.

As described below in conjunction with FIG. 4, the sensor element 20 is placed in areas of the electronic system where leaked cooling liquid is likely to pass and where it is likely to pool. An embodiment of the invention contemplates that a drop of liquid 42 will move toward the sensor element 20 by gravitation force, or will pool adjacent to the sensor element 20. The drop of liquid 42 may be directly from a leak, or may result from condensation. When the drop of liquid 44 contacts the sensor element 20, the liquid 44 is wicked into wicking insulators 26, 28, and 30, into proximity to conductors 22 and 24. The liquid 44 in wicking insulators 26, 28, and 30 electrically couples conductors 22 and 24, and the sensor resistance $R_s$ falls below approximately 300K ohms. Depending on the volume and conductivity of the drop of liquid 44, several drops of liquid may be necessary before the sensor resistance $R_s$ falls below approximately 300K ohms.

Figure 3:
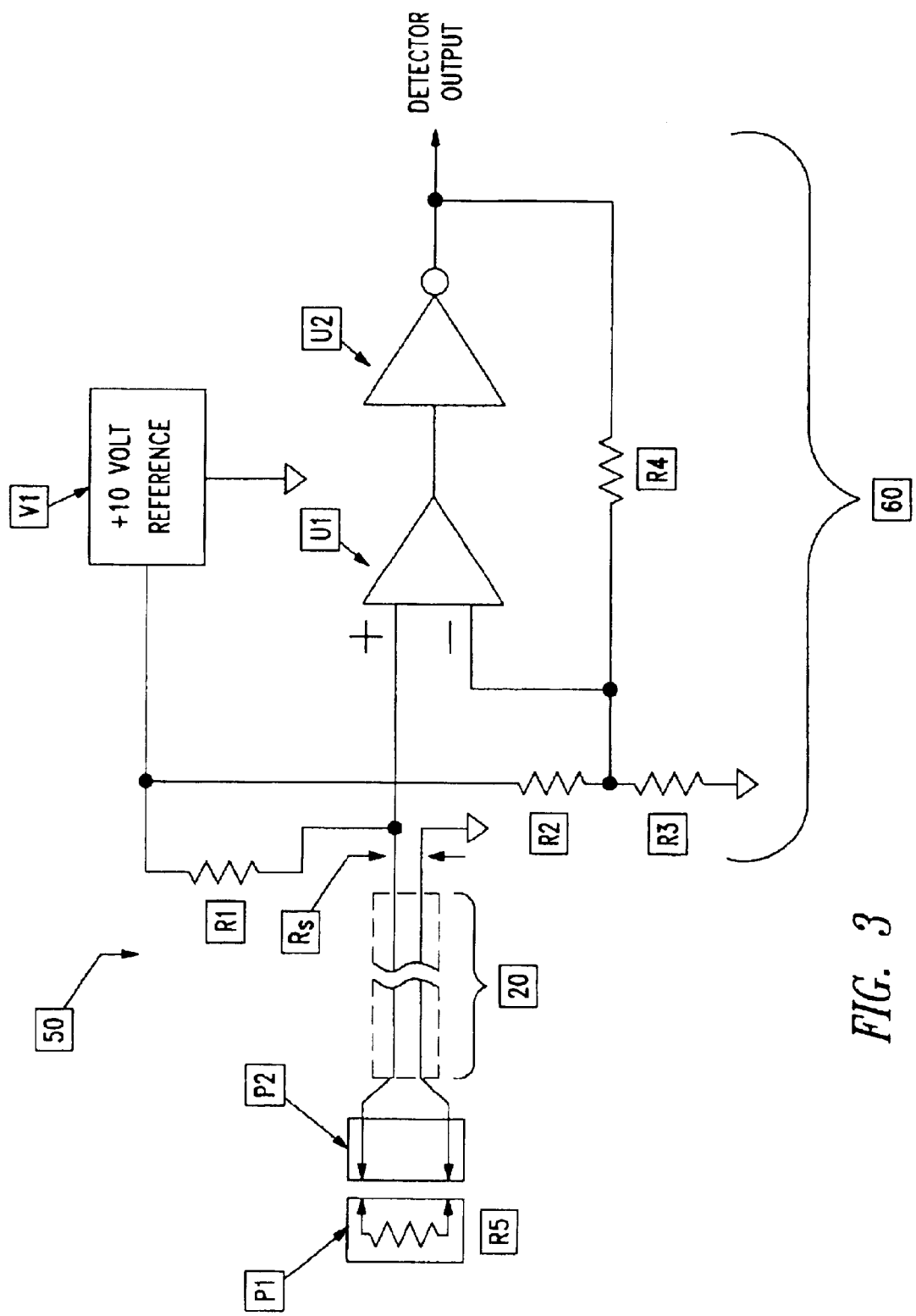
FIG. 3 is a circuit diagram of a liquid sensor that incorporates the sensor element of FIGS. 1 and 2 according to an embodiment of the invention.

FIG. 3 is a block circuit diagram of a sensor 50 for detecting the presence of a liquid within an electronics system, according to an embodiment of the invention. The sensor 50 includes an elongated sensor element 20 that includes a sensor test plug P2; a detector portion 60 that includes resistors R1, R2, R3, and R4, comparator U1, inverting buffer U2, and voltage reference source V1; and test plug P1 that includes resistor R5. An end of sensor element 20 is coupled to the detector portion 60, and the other end is coupled the sensor test plug P2. During normal operation, there is no test plug P1 or other terminating device across the conductors 22 and 24 at the end coupled to the sensor test plug P2.

The detector portion 60 is a DC voltage detector employing a high-input impedance voltage comparator to determine when $R_s$ becomes approximately 300K ohms or less. In one embodiment, V1 is a precision 10-volt reference voltage source. U1 is a high-input impedance voltage comparator, and U2 is an inverting buffer that outputs a detection signal. Resistors R2 and R3 form a voltage divider to establish the threshold voltage for voltage comparator U1, typically at 3.2 volts. Resistor R4 provides positive feedback from inverting buffer U2 to comparator U1. R1 is a pull-up resistor having a value of approximately 1M ohm. Test plug P1 electrically couples with sensor test plug P2, and includes a terminating resistor R5 having a value of approximately 200K to 400K ohms.

In operation, when wicking insulators 26, 28, and 30 are dry, conductors 22 and 24 are not electrically coupled. The sensor resistance $R_s$ is approximately several mega-ohms to several giga-ohms and no current flows through R1. The conductor of sensor element 20 that is coupled to R1 is at the reference voltage. The other conductor is at ground. When liquid wets wicking insulators 26, 28, and 30 and electrically couples conductors 22 and 24, the sensor resistance $R_s$ falls below approximately 300K ohms. A small current flows through R1 and $R_s$, which forms a voltage divider, pulling the voltage applied to the conductor of sensor element 20 below the 3.2-volt threshold voltage of comparator U1. Comparator U1 generates a signal indicating sensor element 20 has been wetted. Inverting buffer U2 inverts the signal from comparator U1 and provides a detector output signal indicating the presence of a liquid. The detector 60 does not force a current through sensor element 20 to measure $R_s$ because the voltage comparator U1 has a high-input impedance. This provides greater accuracy in sensing the electrical coupling between conductors 22 and 24 than would be available if a current were forced through the electrical coupling and using the resulting voltage drop to calculate the resistance.

Another reference voltage source value for V1 may be used in an alternative embodiment, provided the values of the resistors are adjusted to provide the same relative voltages for the threshold voltage of comparator U1 and the voltage applied to the conductor of sensor element 20 that is coupled to resistor R1. In a further alternative embodiment, an AC powered detector may be used to detect the coupling of conductors following the same detection principles as the DC powered detector 60.

Plug P1 is used to test the integrity of sensor element 20 and the threshold of detector 60, and is not a part of the operational configuration of the sensor 50. Plug P1 includes resistor R5, and is arranged to electrically couple resistor R5 to plug P2, which is coupled to conductors 22 and 24 of sensor element 20. Resistor R5 has a value between 200 to 400K ohms, and emulates the resistance of a wetted sensor element 20. The integrity of sensor element 20 may be tested using plug P1 prior to placement of the sensor element 20 in the electronics system, after placement to determine its integrity, and during periodic maintenance checks approximately each six months.

Although FIG. 3 illustrates detector 60 coupled to only one sensor element 20, alternative embodiments of detector 60 provide for a single detector 60 to monitor a plurality of sensor elements. For example, the conductors of each sensor element 20 could be connected in parallel to detector 60 and monitored by a single R1/R$_s$ voltage divider. In an alternative embodiment, each sensor element 20 in a plurality of sensor elements 20 could be individually monitored by an R1/R$_s$ voltage divider. To better define where a leak is being detected in a multiple sensor element system, an indicator means may be added to each individual R1/R$_s$ voltage divider that indicates which sensor element 20 is sensing the electric coupling of the conductors.

Figure 4:
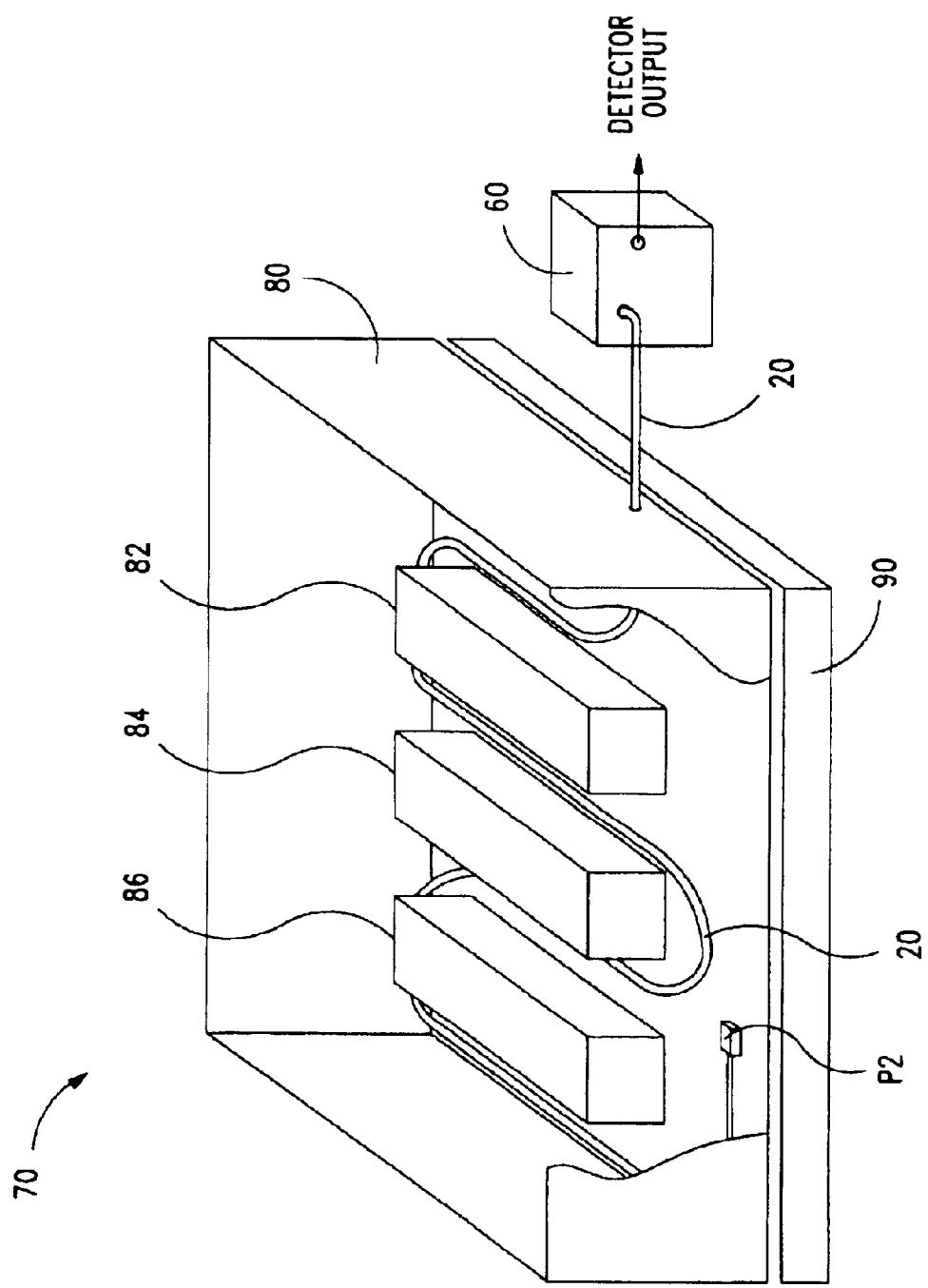
FIG. 4 is a view of an electronics system that incorporates the sensor element of FIG. 3 according to an embodiment of the invention.

FIG. 4 illustrates an electronics system 70 that incorporates the sensor of FIG. 3 to detect the presence of a liquid according to an embodiment of the invention. The electronics system 70 includes an electronics package 80 that contains first, second, and third electronic components 82, 84, and 86, and may be open to the environment, closed, or sealed. The electronics system 70 is cooled by thermal contact with the cold plate 90, which is liquid cooled, typically by deionized water under pressure. The sensor element 20 is placed in proximity to first, second, and third electronic components 82, 84, and 86. Sensor element 20 is located where the cooling liquid or any other liquid might appear. In FIG. 4, sensor element 20 is located to contact any drops of liquid 42 (not shown) approaching the electronic components, or where liquid might pool in electronics system 70. While FIG. 4 illustrates and includes a single sensor element 20 sensing for liquid, several sensor elements 20 may be daisy chained together to protect the electronics components or a plurality of electronic components. Alternatively, several sensor elements 20 may be coupled in parallel to protect a single electronics system 70 or a plurality of electronics systems 70. In another embodiment, the electronics system 70 may be cooled by immersing the electronics package 80 in a cooling bath.

While particular embodiments of the present invention have been shown and described, modifications may be made. It is therefore intended in the appended claims to cover all such changes and modifications that fall within the true spirit and scope of the invention.

What is claimed is:

1. An elongated sensor element for detecting the presence of a liquid, the sensor comprising:
    a pair of adjacent electrical conductors; and
    a liquid permeable material that when dry electrically insulates the conductors, and when wet with a liquid at any point along the length of the conductors allows electric coupling of the conductors,
    the elongated sensor element having a maximum cross-sectional dimension of not more than 1.100 inches.

2. An elongated sensor element for detecting the presence of a liquid, the sensor comprising:
    a pair of adjacent electrical conductors; and
    a liquid permeable material that when dry electrically insulates the conductors, and when wet with a liquid at any point along the length of the conductors allows electric coupling of the conductors,
    the elongated sensor element having a maximum diameter of not more than 1.100 inches.

3. The sensor of claim 1, wherein the maximum cross-sectional dimension is not more than 0.500 inches.

4. The sensor of claim 1, wherein the maximum cross-sectional dimension is not more than 0.250 inches.

5. The sensor of claim 1, wherein the maximum cross-sectional dimension is not more than 0.125 inches.

6. The sensor of claim 1, wherein the maximum cross-sectional dimension is not more than 0.100 inches.

7. The sensor of claim 1, wherein the maximum cross-sectional width dimension is not more than 0.065 inches.

8. An elongated sensor element for detecting the presence of a liquid, the sensor comprising:
    first and second adjacent electrical conductors; and
    an insulator enveloping the first electrical conductor and second electrical conductor, the insulator comprising a liquid permeable material that when dry electrically insulates the conductors, and when wet with a liquid at any point along the length of the conductors allows electric coupling of the conductors,
    the elongated sensor element having a maximum cross-sectional dimension of not more than 1.100 inches.

9. The sensor element of claim 8, wherein the insulator comprises a fiberglass.

10. The sensor element of claim 9, wherein the fiberglass comprises braided stands.

11. An elongated sensor element for detecting the presence of a liquid, the sensor comprising:
    first and second adjacent electrical conductors;
    a first insulator insulating the first electrical conductor; and
    a second insulator insulating the second electrical conductor;
    at least one insulator comprising a liquid permeable material that when dry electrically insulates the conductors, and when wet with a liquid at any point along the length of the conductors allows electric coupling of the conductors,
    the elongated sensor element having a maximum cross-sectional dimension of not more than 1.100 inches.

12. The sensor element of claim 11, further comprising a third insulator insulating both the first and second electrical conductors from other conductors.

13. The sensor element of claim 11, wherein the liquid permeable material is arranged to wick the liquid into the sensor element.

14. The sensor element of claim 11, the liquid permeable material is arranged to wick the liquid into the sensor element, and allow the wicked liquid to electrically couple the conductors.

15. The sensor element of claim 11, wherein the liquid permeable material comprises fiberglass.

16. The sensor element of claim 15, wherein the fiberglass comprises braided strands.

17. The sensor element of claim 11, wherein the liquid permeable material is arranged to allow electric coupling of the conductors between 5 and 180 seconds after the liquid contacts the liquid permeable material.

18. The sensor element of claim 11, wherein the liquid permeable material is arranged to allow electric coupling of the conductors between 10 and 60 seconds after the liquid contacts the liquid permeable material.

19. The sensor element of claim 11, wherein the liquid permeable material is arranged to allow electric coupling of the conductors between 10 and 20 seconds after the liquid contacts the liquid permeable material.

20. The sensor element of claim 11, wherein the electrical conductors are made from a conductive material that is resistant to corrosion by the liquid.

21. A sensor for detecting the presence of a liquid, the sensor comprising:
    an elongated sensor element having a pair of adjacent electrical conductors, and a liquid permeable material that when dry electrically insulates the conductors, and when wet with the liquid at any point along the length of the conductors wicks the liquid to the conductors at a controlled rate and allows electric coupling of the conductors; and a detector operable to detect the presence of the liquid by sensing the electrical coupling of the conductors.

22. The system of claim 21, wherein the detector includes a voltage comparator operable to sense the electrical coupling of the conductors.

23. The system of claim 21, wherein the sensor element has a maximum cross-sectional width of not more than 1.100 inches.

24. The system of claim 23, wherein the cross-sectional width is a diameter.

25. The system of claim 21, wherein the sensor element has a maximum cross-sectional width of not more than 0.500 inches.

26. The sensor of claim 21, wherein the sensor element has a maximum cross-sectional width of not more than 0.100 inches.

27. The sensor of claim 21, wherein the liquid permeable material further comprises a first liquid permeable material insulating the first electrical conductor, and a second liquid permeable material insulating the second electrical conductor.

28. The sensor of claim 27, the sensor element further comprising a third insulator insulating both the first and second electrical conductors.

29. The sensor of claim 21, wherein the liquid permeable material comprises fiberglass.

30. The sensor element of claim 29, wherein the fiberglass comprises braided stands.

31. An electronics system comprising:
at least one electronic component;
an elongated sensor element placed in proximity to at least one electronic component, the sensor element having a pair of adjacent electrical conductors, and a liquid permeable material that when dry electrically insulates the conductors, and when wet with the liquid at any point along the length of the conductors wicks the liquid to the conductors at a controlled rate and allows electric coupling of the conductors; and
a detector operable to detect the presence of the liquid by sensing the electrical coupling of the conductors.

32. The electronics system of claim 31, wherein the sensor element has a maximum cross-sectional width of not more than 1.100 inches.

33. The electronics system of claim 32, wherein the cross-sectional width is a diameter.

34. The electronics system of claim 31, wherein the detector includes a voltage comparator operable to sense the electrical coupling of the conductors.

35. The electronics system of claim 31, wherein the liquid permeable material further comprises a first liquid permeable material insulating the first electrical conductor, and a second liquid permeable material insulating the second electrical conductor.

36. The electronics system of claim 31, the sensor element further comprising a third liquid permeable material insulating both the first and second electrical conductors from other conductors.

37. The sensor of claim 31, wherein the liquid permeable material comprises fiberglass.

38. A method of forming an elongated sensor element comprising:
insulating a first electrical conductor with a liquid permeable material that when dry electrically insulates the conductor, and when wet with a liquid at any point along the length of the conductor allows electrical coupling of the conductor;
insulating a second electrical conductor with the liquid permeable material; and
arranging the insulated first electrical conductor and the insulated second electrical conductor into a pair of adjacent conductors, such that the arrangement has a maximum cross-sectional dimension of not more than 1.100 inches.

39. The method of claim 38, further comprising insulating the pair of adjacent conductors with the liquid permeable material, such that the further insulated pair of conductors has a maximum cross-sectional dimension of not more than 1.100 inches.

* * * * *